(12) United States Patent
Tomita et al.

(10) Patent No.: US 7,446,917 B2
(45) Date of Patent: Nov. 4, 2008

(54) OPTICAL SCANNING APPARATUS

(75) Inventors: Ken-ichi Tomita, Mishima (JP); Masaki Sato, Numazu (JP); Akihiro Fukutomi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/761,063

(22) Filed: Jun. 11, 2007

(65) Prior Publication Data
US 2007/0228266 A1  Oct. 4, 2007

Related U.S. Application Data

(63) Continuation of application No. PCT/JP2006/326414, filed on Dec. 28, 2006.

(30) Foreign Application Priority Data

| Jan. 5, 2006 | (JP) | ............................. 2006-000423 |
| Jan. 5, 2006 | (JP) | ............................. 2006-000424 |
| Dec. 27, 2006 | (JP) | ............................. 2006-351008 |

(51) Int. Cl.
*G02B 26/08* (2006.01)

(52) U.S. Cl. ...................... 359/204; 359/205
(58) Field of Classification Search .......... 359/204–208
See application file for complete search history.

(56) References Cited

U.S. PATENT DOCUMENTS

| 4,962,983 A | 10/1990 | Watanabe |
| 5,091,793 A | 2/1992 | Goto et al. |
| 5,748,355 A * | 5/1998 | Shiraishi et al. ............. 359/206 |
| 6,181,363 B1 | 1/2001 | Satoh |
| 6,313,906 B1 | 11/2001 | Nagasaka et al. |
| 6,950,216 B2 | 9/2005 | Kaneko et al. |
| 2003/0227659 A1 | 12/2003 | Kaneko et al. ............. 359/197 |
| 2006/0103906 A1 | 5/2006 | Sato et al. |

FOREIGN PATENT DOCUMENTS

| DE | 103 25 285 | 12/2003 |
| JP | 64-3618 | 1/1989 |
| JP | 1-164917 | 6/1989 |
| JP | 3-042116 | 4/1991 |
| JP | 3-203043 | 9/1991 |
| JP | 11-119131 | 4/1999 |
| JP | 2000-039574 | 2/2000 |
| JP | 2000-098277 | 4/2000 |
| JP | 2004-012774 | 1/2004 |
| JP | 2004-020607 | 1/2004 |
| JP | 2004-279657 | 10/2004 |

* cited by examiner

*Primary Examiner*—Euncha P Cherry
(74) *Attorney, Agent, or Firm*—Fitzpatrick, Cella, Haper & Scinto

(57) ABSTRACT

An optical scanning apparatus constructed to dispose optical elements guiding light beams to a deflector such as a rotary polygon mirror at a low cost with high accuracy, includes a first light source, a second light source, a deflector, a first optical member provided on a first optical path between the first light source and the deflector, a second optical member provided on a second optical path between the second light source and the deflector, and one wall holding both of a side surface of the first optical member and a side surface of the second optical member.

8 Claims, 6 Drawing Sheets

OPTICAL SCANNING APPARATUS

This application is a continuation of International Application No. PCT/JP2006/326,414, filed Dec. 28, 2006, which claims the benefit of Japanese Patent Applications No. 2006-000423, filed Jan. 5, 2006, No. 2006-000424 filed Jan. 5, 2006 and No. 2006-351008 filed Dec. 27, 2006.

BACKGROUND OF THE INVENTION

1. Field of the Invention

The present invention relates to an optical scanning apparatus used for a copying machine and a laser printer.

2. Description of the Related Art

There have hitherto been widely utilized a digital copying machine and a printer, wherein electrically-charged photosensitive bodies are scanned by and exposed to light beams modulated corresponding to image information, electrostatic latent images are thus formed, and the images are obtained through electrophotographic processes such as developing, transferring and fixing.

Similarly, a full-color copying machine and a color printer are widely utilized, wherein image signals corresponding to yellow (Y), magenta (M), cyan (C) and black (K) undergo charging, exposing and developing, and a full-color image is formed by superposing and transferring these color images.

Over recent years, this type of full-color image forming apparatus has utilized a widespread so-called tandem system, wherein image forming portions corresponding to the developing colors (Y, M, C, K) are tandemly arranged, and the full-color image is formed via one path in a way that sequentially superposes the transferred images.

One example of the tandem system is a multi-beam scan apparatus (refer to Japanese Patent Application Laid-Open No. H11-119131), wherein a plurality of light beams incident on a deflection mirror side-by-side in a sub-scanning direction are deflected by mirror surfaces of the deflection mirror to be rotated. Then, the plurality of light beams scan on a plurality of scanned surfaces in a main-scanning direction. This optical scanning apparatus employs a so-called under-field optical system having a characteristic that a width, in the main-scanning direction, of the light beams incident on the deflection mirror is set narrower than a width, in the main-scanning direction, of one surface of the deflection mirror.

In the optical scanning apparatus discussed in Japanese Patent Application Laid-Open No. H11-119131, the plurality of light beams scan on the plurality of scanned surfaces in the mains-canning direction through one deflection mirror. Therefore, incidence optical elements making the light beams incident on the deflection mirror are required to be disposed side by side in the sub-scanning direction (vertical direction). The under-field optical system, however, if the incidence optical elements disposed side by side in the sub-scanning direction are not laid out with high accuracy, comes to have such a problem that positions in which to depict the scanned surfaces in the main-scanning direction deviate between the plural light beams.

If the incidence optical elements are disposed in close proximity for downsizing the apparatus, it is difficult to form bearing surfaces mounted with the incidence optical elements in the sub-scanning direction. Such being the case, if an angle made by the plurality of optical systems is set large at a long distance, such a problem arises that the apparatus gets upsized.

By the way, improvement of a recording speed (the number of output sheets per unit time) has been increasingly demanded of the image forming apparatus over recent years.

In the printer and the copying machine, the increase in the number of output sheets per unit time must involve increasing a scan speed of the light beams on the photosensitive drums. A scan speed increasing method is exemplified by a method of increasing a rotating speed of a rotary polygon mirror and a method of providing a multi-beam system using a plurality of light sources. An over-field type optical scanning apparatus capable of obtaining an increased number of reflection surfaces while restraining a diameter of the rotary polygon mirror is known as one of the scan speed increasing techniques. The over-field type optical scanning apparatus has a characteristic that the width, in the main-scanning direction, of the light beams incident on the rotary polygon mirror is larger than the width, in the main-scanning direction, of one surface of the rotary polygon mirror.

One of the over-field type optical scanning apparatuses is an apparatus including lenses each having refracting power in only the main-scanning direction, wherein the width, in the main-scanning direction, of the light beams emitted from the laser light source is set large (refer to Japanese Patent Application Laid-Open No. 2004-020607).

If the construction that the plurality of light beams emitted from the plurality of light sources arranged side by side with the deviation in the sub-scanning direction scan on the plurality of scanned surfaces in the main-scanning direction through the single deflection mirror is applied to the over-field optical system, however, the optical elements provided between the plurality of light sources and the deflection mirror are required to be positioned with high accuracy in the main-scanning direction between the optical elements (e.g., cylindrical lenses) each having the same function. if not done so, when the plurality of light beams scan on the scanned surfaces in the main-scanning direction, distributions of light quantities used by the light beams differ from each other, and an image quality might decline.

SUMMARY OF THE INVENTION

The present invention can dispose optical elements guiding light beams to a deflector such as a rotary polygon mirror at a low cost with high accuracy.

The present invention can provide an optical scanning apparatus comprising: a first light source; a second light source disposed with deviation in a sub-scanning direction from the first light source; a deflector that deflects a first light beam emitted from the first light source and a second light beam emitted from the second light source, and that scans different scanned surfaces from each other with the first and second light beams in a main-scanning direction; a first optical member that is provided on a first optical path between the first light source and the deflector, and that guides the first light beam emitted from the first light source to the deflector; a second optical member that is provided on a second optical path between the second light source and the deflector, and that guides the second light beam emitted from the second light source to the deflector; and a wall holding both of a side surface of the first optical member and a side surface of the second optical member.

Further features of the present invention will become apparent from the following description of exemplary embodiments with reference to the attached drawings.

DESCRIPTION OF THE EMBODIMENTS

Exemplary embodiments for carrying out the present invention will hereinafter be described in detail with reference to the drawings. However, dimensions, materials, shapes and relative arrangements of the components described in the embodiments should be properly changed corresponding to a construction of an apparatus to which the present invention is applied and a variety of conditions, so the scope of the present invention should not be limited to the following embodiments.

First Embodiment

The discussion will start with a description of an image forming apparatus including an optical scanning apparatus according to an embodiment of the present invention.

(Image Forming Apparatus 15)

Figure 1:
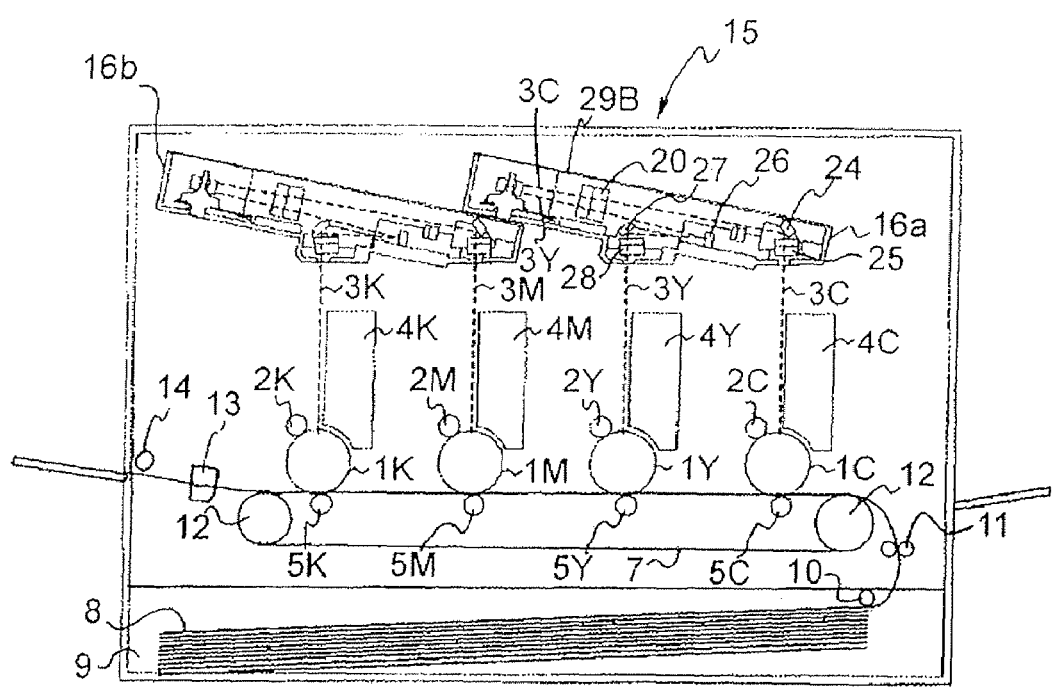
FIG. 1 is a schematic view of an image forming apparatus 15 mounted with an optical scanning apparatus according to a first embodiment of the present invention.

FIG. 1 is a schematic view of an image forming apparatus 15. The image forming apparatus 15 is a color laser printer. As illustrated in FIG. 1, the image forming apparatus 15 includes an optical scanning apparatus 16a and an optical scanning apparatus 16b that will be described later on.

When image information is input to the image forming apparatus 15 from one of a personal computer and an image reader, light beams 3C, 3Y, 3M, 3K (laser beams) optically modulated based on the image information outgo from the optical scanning apparatuses (laser scan units) 16a, 16b. The light beams 3C, 3Y, 3M, 3K are irradiated over surfaces of photosensitive drums 1C, 1Y, 1M, 1K that are uniformly charged beforehand by primary charging units 2C, 2Y, 2M, 2K. Electrostatic latent images corresponding to the image information of the respective colors are thereby formed on the photosensitive drums 1C, 1Y, 1M, 1K.

The electrostatic latent images are supplied with toner in cyan, yellow, magenta and black from developing units 4C, 4Y, 4M, 4K, thereby the electrostatic latent images are visualized into toner images.

On the other hand, transfer materials 8 stacked on a sheet feeding tray 9 are sequentially fed sheet by sheet by a feeding roller 10. The transfer materials 8 are fed by a resisting roller 11 onto a transfer belt 7 in a way that synchronizes with image write starting timing. The transfer belt 7 is conveyed by a drive roller 12. The drive roller 12 is driven by a drive motor (unillustrated).

Thus, the transfer material 8 is conveyed by the transfer belt 7, and meanwhile, the toner images in cyan, yellow, magenta and black, which are formed on the surfaces of the photosensitive drums 1C, 1Y, 1M, 1K, are electrostatically transferred in sequence onto the transfer material 8 by the transfer rollers 5C, 5Y, 5M, 5K. The color images are thereby formed on the transfer material 8.

The color toner image formed on the transfer material 8 is thermally fixed by a fixing unit 13. Thereafter, the transfer material 8 is conveyed by a discharging roller 14 and outputted to the outside of the apparatus.

(Optical Scanning Apparatuses 16a, 16b)

Figure 2:
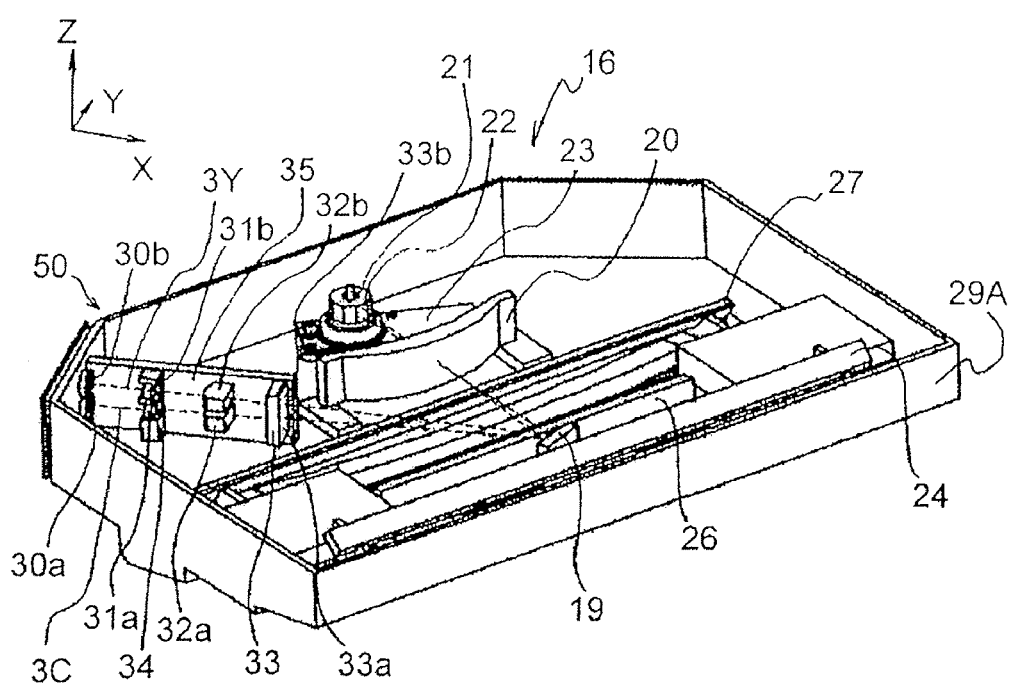
FIG. 2 is an explanatory view of an internal construction of an optical scanning apparatus 16a according to the first embodiment.

Next, the optical scanning apparatus according to the first embodiment of the present invention will be described. FIG. 2 illustrates an internal construction of the optical scanning apparatus 16a. The optical scanning apparatus 16b has the same construction, and hence the discussion will be focused on the optical scanning apparatus 16a while the description of the optical scanning apparatus 16b is omitted.

As illustrated in FIG. 1, the single optical scanning apparatus 16 in the first embodiment emits the light beams corresponding to the image information to the two photosensitive drums. As illustrated in FIG. 2, the optical scanning apparatus 16a includes a semiconductor laser (a first light source) 30a and a semiconductor laser (a second light source) 30b disposed with deviation in a sub-scanning direction (Z-direction) with respect to the semiconductor laser 30a. The semiconductor laser 30a emits a light beam (a first light beam) 3C, and the semiconductor laser 30b emits a light beam (a second light beam) 3Y. The light beams 3C, 3Y emitted from the semiconductor lasers 30a, 30b travel through collimator lenses 31a, 31b, cylindrical lenses 32a, 32b and imaging lenses 33a, 33b, respectively. Thereafter, the light beams 3C, 3Y are reflected by a reflection mirror 19 in a direction of a fθ lens 20. The light beams 3C, 3Y reflected by the reflection mirror 19 are, after traveling though the fθ lens 20, converged on a light beam reflecting surface 22 of a rotary polygon mirror (deflector) 21.

The rotary polygon mirror 21 is attached to a rotor of the motor mounted on a drive circuit board 23 and is rotated by this motor. Thus, one rotary polygon mirror (deflector) 21 deflects the first light beam 3C emitted from the semiconductor laser (the first light source) 30a and the second light beam 3Y emitted from the semiconductor laser (the second light source) 30b. The light beam 3C deflected by the rotary polygon mirror 21 passes through again the fθ lens 20. The light beam 3C, after being reflected by a reflection mirror 24, travels through a fθ lens 25 illustrated in FIG. 1 and converges on the photosensitive drum (scanned surface) 1C. This scan beam forms the electrostatic latent image corresponding to cyan.

On the other hand, the light beam 3Y deflected by the rotary polygon mirror 21 travels through again the fθ lens 20. The light beam 3Y, after being reflected by reflection mirrors 26 and 27, travels through a fθ lens 28 illustrated in FIG. 1 and converges on the photosensitive drum 1Y. This scan beam forms the electrostatic latent image corresponding to yellow.

The optical components such as the deflector, the reflection mirrors and the fθ lenses are boxed in a resinous optical box (a box body of the apparatus) 29A. An upper opening of the optical box 29A is closed by a cover member 29B (see FIG. 1).

(Incidence Optical System 50)

Figure 3:
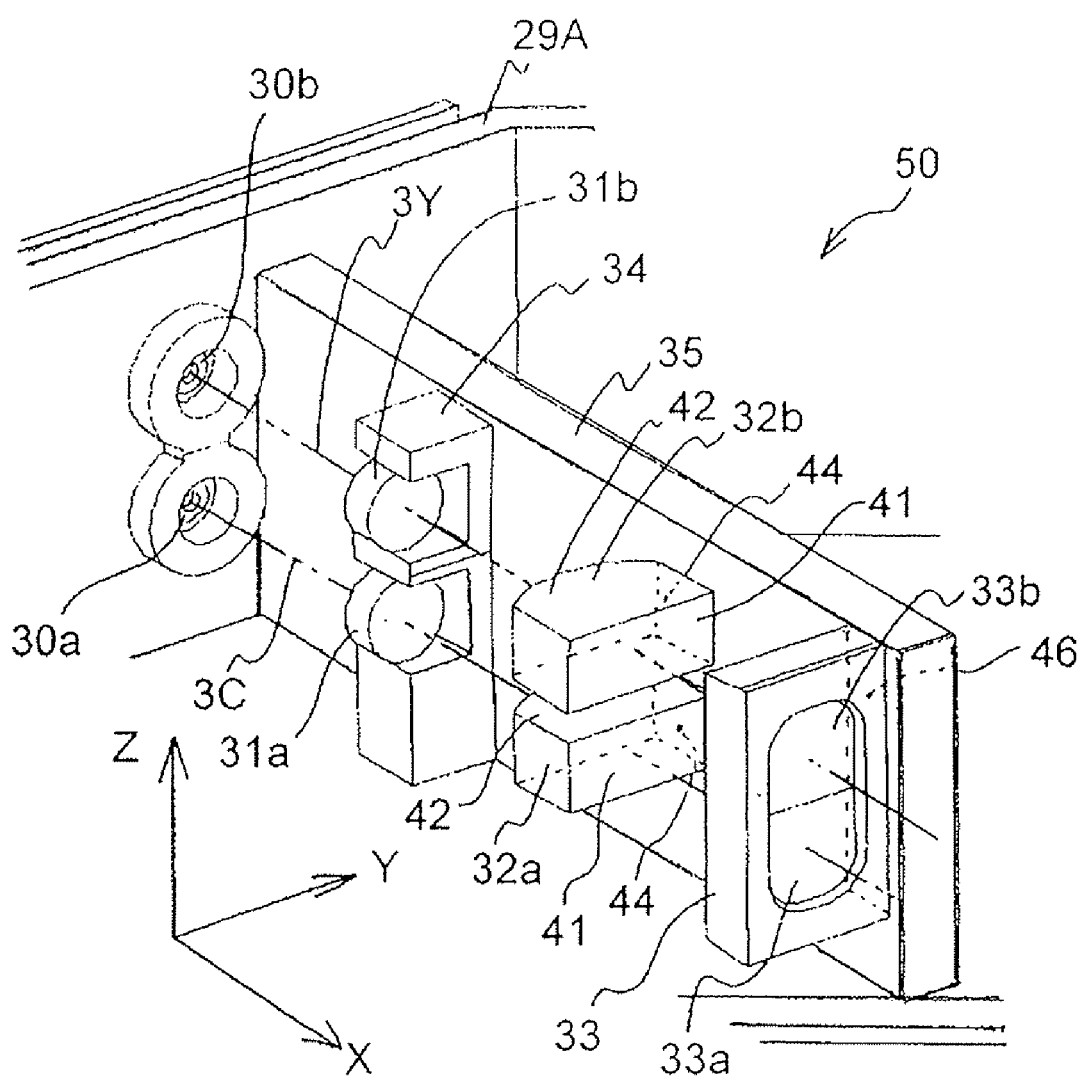
FIG. 3 is an explanatory view of an incidence optical system 50 within the optical scanning apparatus according to the first embodiment.

Next, the following in-depth description will deal with a construction of an optical system (referred to as an incidence optical system 50) that forms an image of the light beam emitted from the light source as an elongate line image in a main-scanning direction on the deflector. FIG. 3 is an enlarged view of the incidence optical system 50. In FIG. 3, the Z-axis is an axis in the same direction as an axis of rotation of the rotary polygon mirror 21. The X-axis is an optical axis of the incidence optical system 50, which is orthogonal to the Z-axis. The Y-axis is an axis orthogonal to the X-axis within the main-scanning plane. The main-scanning direction represents a scanning direction of the deflection by the deflector.

As illustrated in FIG. 3, the incidence optical system 50 includes the semiconductor laser 30, the collimator lens 31, the cylindrical lens 32 and the imaging lens 33. The optical elements are constructed at two stages in the sub-scanning direction. Accordingly, a first optical path is formed between the semiconductor laser (the first light source) 30a and the rotary polygon mirror 21. A second optical path is formed between the semiconductor laser (the second light source) 30b and the rotary polygon mirror 21. The semiconductor lasers 30a, 30b are press-fixed within the optical box 29A. The collimator lenses 31a, 31b are fixedly bonded to a collimator lens holder 34. The collimator lens holder 34 is fixedly bonded to a resinous fixation wall 35. The fixation wall 35 is an integral molding with the optical box (the box body of the optical scanning apparatus) 29A. The fixation wall 35 takes a shape protruding from the bottom surface of the optical box 29A so as to be orthogonal to the plane including the Y-axis and the Z-axis.

The cylindrical lenses 32a, 32b are lenses each having refracting power in only the main-scanning direction. The cylindrical lenses 32a, 32b are fixedly bonded to the fixation wall 35 at edge surfaces (side surfaces) 44 thereof in the main-scanning direction. The resinous imaging lens 33 is constructed by integrally molding the lower imaging lens 33a and the upper imaging lens 33b together. The imaging lens 33 is an anamorphic lens having the refracting power both in the main-scanning direction and in the sub-scanning direction. The imaging lens 33 is fixedly bonded to the fixation wall 35 at an edge surface (side surface) thereof in the main-scanning direction.

Thus, all of the optical elements (the collimator lens 31, the cylindrical lens 32, the imaging lens 33) provided on the optical path between the light source 30 and the deflector 21, are directly abutted on and fixed to the fixation wall 35 in the main-scanning direction. Alternatively, these optical elements are abutted on and fixed to the fixation wall 35 in the main-scanning direction via a holding member (which is the collimator lens holder 34, and a frame of the imaging lens 33). Herein, the optical elements and the holding member are generically termed optical members.

The first optical path and the second optical path in the incidence optical system 50 are not parallel with the X-axis in the first embodiment. The first optical path and the second optical path are inclined at 1.5° opposite to each other in the Z-direction. Namely, the first optical path and the second optical path take a relative angle of 3° therebetween. In other words, the optical axis of the first light beam is inclined at 3° to the optical axis of the second light beam. The light source and the plurality of optical elements are laid out to take this relative angle. This relative angle may be set at a predetermined angle suited to the apparatus.

The cylindrical lens 32 in the first embodiment is a glass lens having a curvature in only the main-scanning direction. Therefore, the cylindrical lens 32 has the power (refracting power) in only the main-scanning direction.

Figure 4:
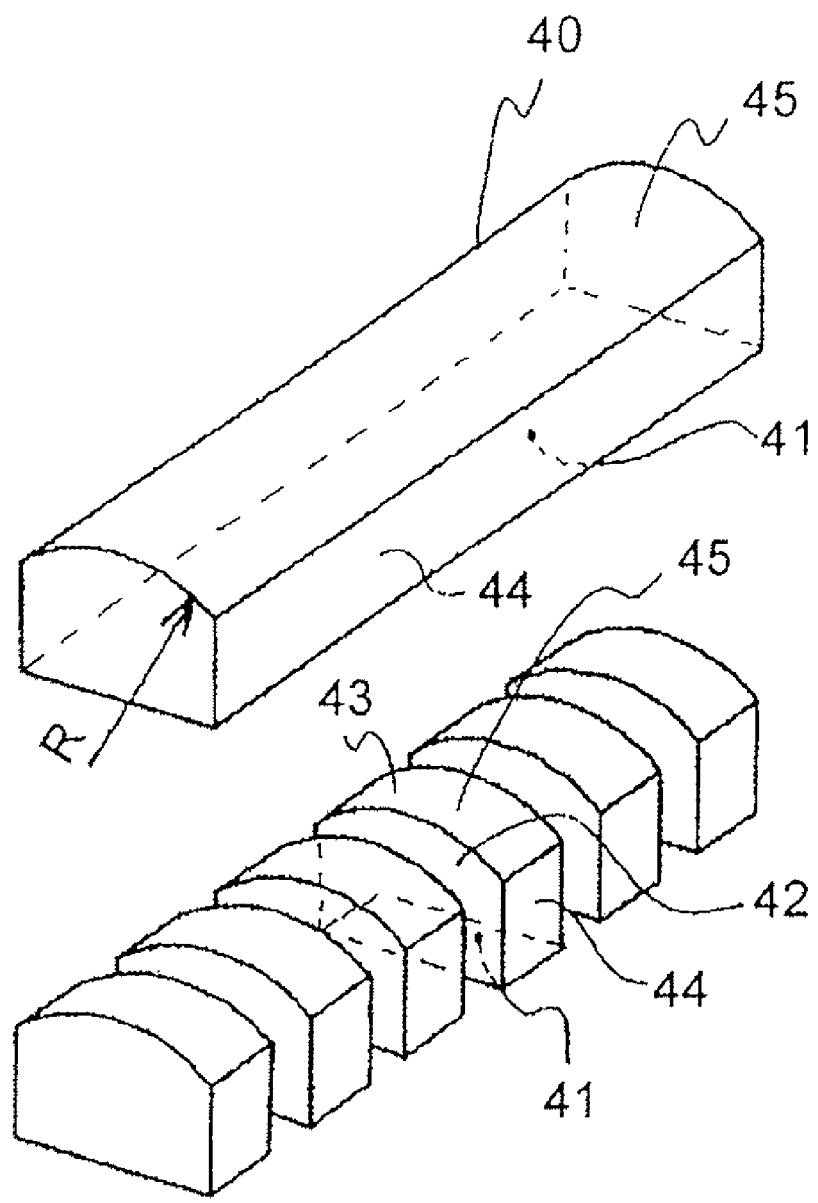
FIG. 4 is a view illustrating a manufacturing process of a cylindrical lens 32 used for the optical scanning apparatus according to the first embodiment.

Herein, the cylindrical lens 32 in the first embodiment is manufactured preferably as below. FIG. 4 is a view illustrating a manufacturing process of the cylindrical lens 32. As illustrated in FIG. 4, to begin with, a glass base material 40 taking substantially a rectangular parallelepiped is fixed, with the bottom surface 41 and the side surface 44 serving as the reference surfaces, and a lens surface 45 undergoes grinding to have a fixed central radius R. Next, the base material 40 is cut off to predetermined lengths, thereby obtaining a plurality of cylindrical lenses each having a cut-off surface 42. Thus, the plurality of cylindrical lenses 32 is manufactured by grinding and thereafter cutting off the single base material 40. The curvature of the lens surface of each cylindrical lens 32 is thereby fixed, and the advantageous construction in terms of accuracy is taken.

The manufactured cylindrical lens 32 is fixed to the fixation wall 35. On this occasion, as illustrated in FIG. 3, the surface (side surface) 44 of the cylindrical lens 32 is abutted on the fixation wall 35. As described above, the surface (side surface) 44 serves as the reference surface when grinding the lens surface 45. Hence, this surface (side surface) 44 is positioned and then fixed to the fixation wall 35, whereby the lens surface 45 does not incline to the optical axes of the light beams 3C, 3Y.

Thus, the light beam transmitting surface of the cylindrical lens 32 can be restrained from inclining by taking the construction of fixing, to the fixation wall 35, the edge surface (side surface) in the main-scanning direction of the glass cylindrical lens 32 having the refracting power in the main-scanning direction. There is no necessity of newly processing the positioning surface, and hence the cost can be reduced. Accordingly, the cylindrical lens 32 can be disposed in the optical box idealistically at a low cost.

In the first embodiment, the resinous imaging lenses 33a, 33b each having the refracting power in the sub-scanning direction are also fixed to the fixation wall 35 at the surfaces (side surfaces) 46 in the main-scanning direction (Y-direction). Therefore, if the two imaging lenses 33a, 33b expand due to a rise in temperature of an interior of the apparatus when driving the apparatus, these imaging lenses expand in the main-scanning direction on the basis of the fixation wall 35. Therefore, a positional relationship between the two imaging lenses 33a, 33b in the sub-scanning direction remains substantially unchanged. As a result, an occurrence of color deviation on the photosensitive drum 1 can be restrained.

Thus, a distance between the optical axes of the two resinous imaging lenses 33 can be restrained from fluctuating in the sub-scanning direction by fixing the two resinous imaging lenses 33 each having the refracting power in the sub-scanning direction to the fixation wall at their edge surfaces (side surfaces) in the main-scanning direction.

As in the case of the cylindrical lens 32 and the imaging lens 33, the first optical member provided on the first optical path between the first light source and the deflector and the second optical member provided on the second optical path between the second light source and the deflector, are held by the same member (the fixation wall 35) at their edge surfaces (side surfaces) in the main-scanning direction. With this construction, the positional accuracy in the main-scanning direction between the first optical path and the second optical path is improved. Hence, this construction, if applied to an under-field optical system, enables the positions depicted by the first light beam and the second light beam on the scanned surfaces in the main-scanning direction to be restrained from deviating between the two light beams. This construction, if applied to an over-field optical system, enables an image quality to be restrained from declining, because distributions of light quantities used when the first light beam and the second light beam scan on the scanned surfaces are always constant between the two light beams. In the case of using the glass lens as the optical element applied to the over-field optical system, the glass lens is hard to expand by the heat. Therefore, if both of these two glass lenses are positioned with high accuracy in the main-scanning direction, a peak area of light quantity (an area where the peak of the light quantity of the beam exists at the center of the scan line in the main-scanning direction) can be always used. In the case of employing the resinous lenses in place of the glass lenses, even if the resinous lenses are deformed in the main-scanning direction due to the thermal expansion, the two resinous lenses are deformed in the same way. Hence, even if the areas to be used deviate in the main-scanning direction from the original peak area, the areas having same light quantities are always used between the two resinous lenses. Hence, the image quality can be restrained from declining.

As described above, the present construction has merits if applied to the under-field optical system, if applied to the over-field optical system, and if using the glass lenses or the resinous lenses as the optical elements applied to the over-field optical system. This construction can improve the optical characteristics of the optical scanning apparatus.

The first embodiment has exemplified the optical scanning apparatus mounted on the printer having the construction that the single optical apparatus scans on the two photosensitive drums. It may not, however, cause any inconvenience to apply the present invention to an optical scanning apparatus mounted on a printer having a construction that the single optical apparatus scans on the four photosensitive drums. In this case also, it may be sufficient to take the construction that the first optical member and the second optical member, which form the incidence optical system, are held by the fixation wall at their edge surfaces (side surfaces) in the main-scanning direction.

In the first embodiment, all of the optical members provided on the optical path between the light source and the deflector are held by the fixation wall at their edge surfaces (side surfaces) in the main-scanning direction, and hence the positional accuracy of the installation between the optical members is also improved.

In the first embodiment, the optical members are held at the edge surfaces (side surfaces) in the Y-direction, and hence the holding member for holding the edge surfaces (bottom surfaces) in the Z-direction is not required. This construction enables the optical members to be arranged in close proximity in the Z-direction. Accordingly, the incidence optical system 50 can be constructed relatively small in the Z-direction, whereby downsizing of the apparatus can be actualized.

In addition, the imaging lens 33 is constructed as the integral resin molding of the lower imaging lens 33a and the upper imaging lens 33b. The cost can be therefore reduced.

The imaging lens 33 is the integral molding of the lower imaging lens 33a and the upper imaging lens 33b, and therefore the Y-directional side surface 46 takes a shape that is elongate in the sub-scanning direction. Hence, the bonding strength can be increased because of having a large surface area bonded to the fixation wall 35, and this is advantageous in terms of keeping an attitude of the imaging lens about the X-axis with the high accuracy.

The present invention is not limited to the construction of the first embodiment discussed above. For example, the optical elements such as the semiconductor laser, the collimator lens, the cylindrical lens and the imaging lens may not directly be fixed within the optical box. Namely, the same effect is acquired in a way that disposes these optical elements within the optical scanning apparatus as the optical members properly via the holding member.

The fixation wall, which holds the edge surfaces (side surfaces) of the optical members in the main-scanning direction, may not be molded integrally with the optical box. As in the first embodiment, however, the integral molding with the optical box can be adopted because of exhibiting higher accuracy of fitting the optical members.

Second Embodiment

Next, a second embodiment of the present invention will be described. The following discussion will be focused on different points from the first embodiment, and the descriptions of the same components as in the first embodiment are omitted in a way that marks these components with the same reference numerals and symbols.

Figure 5:
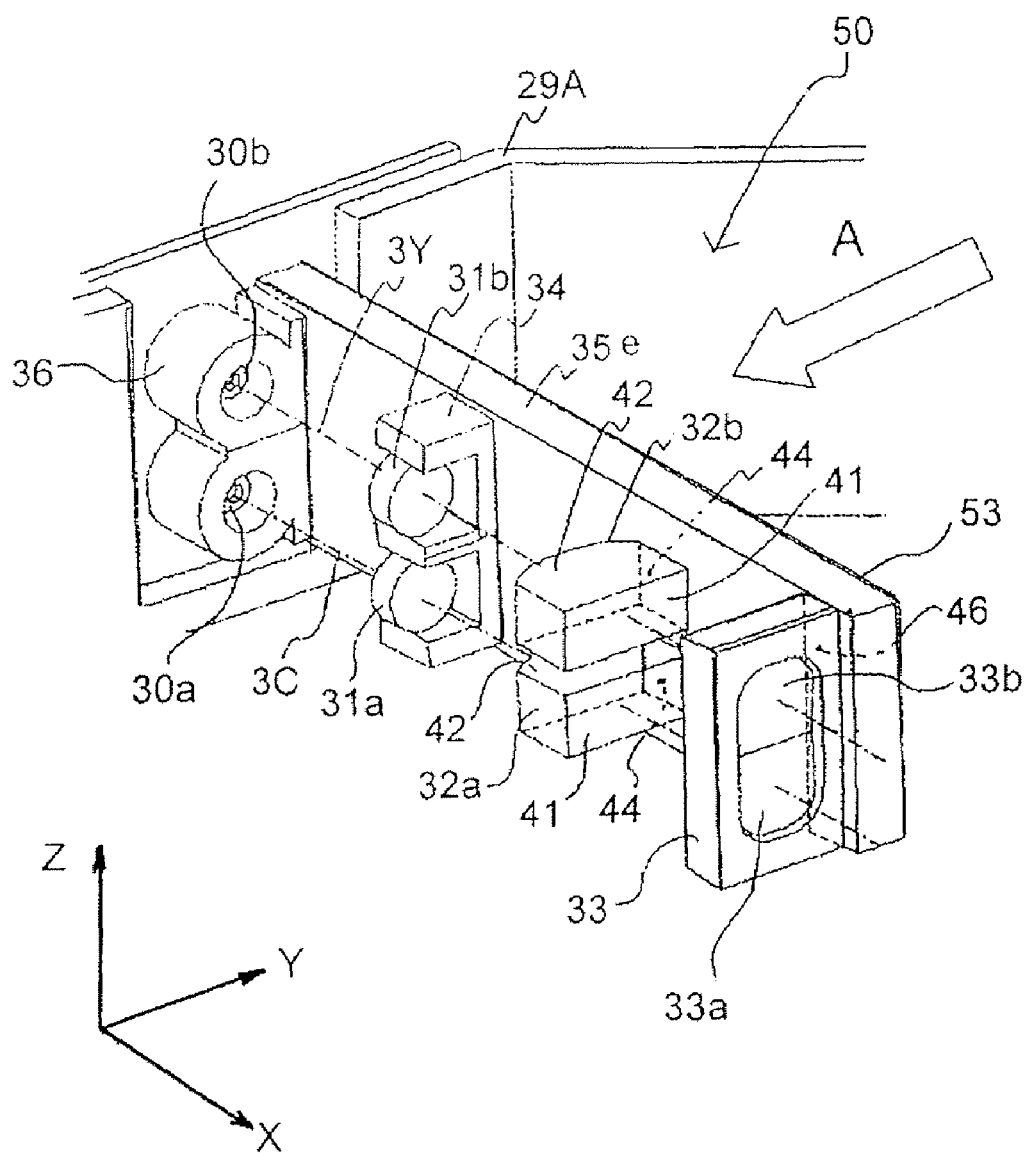
FIG. 5 is an explanatory view of the incidence optical system 50 within the optical scanning apparatus

FIG. 5 is an explanatory view of the incidence optical system 50 within the optical apparatus according to the second embodiment. In FIG. 5, the Z-axis is the axis in the same direction as an axis of rotation of the rotary polygon mirror 21. The X-axis is the optical axis of the incidence optical system 50, which is orthogonal to the Z-axis. The Y-axis is the axis orthogonal to the X-axis within the main scanning plane. The main-scanning direction represents the scanning direction of the deflection by the deflector.

As illustrated in FIG. 5, the incidence optical system 50 includes, as the optical elements, the semiconductor lasers 30a, 30b, the collimator lenses 31a, 31b, the cylindrical lenses 32a, 32b and the imaging lenses 33a, 33b. The optical elements are constructed at the two stages in the sub-scanning direction (Z-direction). Accordingly, the first optical path is formed between the semiconductor laser (the first light source) 30a and the rotary polygon mirror 21. The second optical path is formed between the semiconductor laser (the second light source) 30b and the rotary polygon mirror 21.

The semiconductor lasers 30a, 30b are press-fixed by a laser holder (holding member) 36. The collimator lenses 31a, 31b are fixedly bonded to the collimator lens holder (holding member) 34. The imaging lens 33 is constructed as the integral resin molding of the lower imaging lens 33a and the upper imaging lens 33b.

All of the held semiconductor laser 30, collimator lens 31, cylindrical lens 32 and imaging lens 33 are abutted on and fixed in the main-scanning direction (Y-direction) to a transparent or semi-transparent glass plate 35e serving as the fixation wall to which the optical element or the holding member thereof is fixed. This fixation is attained by bonding fixation using a bonding agent having light-curing property (e.g., ultraviolet-ray curing property). Herein, the glass plate 35e is a plate member and is formed so that its surface for fixing the optical element exhibits high flatness. The glass plate 35e is fixedly disposed on the bottom surface of the optical box 29A so as to be orthogonal to the plane including the Y-axes and Z-axes.

When bonding the optical element to the glass plate 35e, at first, the ultraviolet-ray hardening type bonding agent is applied between the optical element and the glass plate 35e, and the optical element or the holding member is abutted on the glass plate 35e. Next, the bonding agent is irradiated with the ultraviolet rays in the direction of arrow A in FIG. 5. Herein, the glass plate 35e serving as the fixation wall is transparent or semi-transparent, and hence the radiated ultraviolet rays pass through the glass plate 35e and reach the bonding agent. Hence, the bonding agent can be prevented from remaining unhardened. This bonding process enables the bonding agent to be hardened in a state where the optical element or the holding member is surely abutted on the glass plate 35e. In the case of an opaque fixation wall, the optical element is abutted directly or via the holding member upon the fixation wall, and therefore, if the optical element or the holding member is grasped by a tool, an area through which to transmit the ultraviolet rays is lost, resulting in difficulty of performing the secure fixation. According to the second embodiment, however, the fixation wall is transparent, and hence the optical element can be fixed with high accuracy.

In addition, a linear expansion coefficient of the glass is smaller than that of the resin. Therefore, as compared with the case of using the resin material for the fixation wall, thermal deformation of the glass plate 35e due to the thermal expansion can be restrained. It is therefore feasible to provide a high-performance optical scanning apparatus, wherein fluctuation of a beam height and fluctuation of a print are small.

The second embodiment has exemplified the fixation wall entirely using the transparent or semi-transparent glass plate 35e. The construction is, however, sufficient if capable of bond-fixing the optical element or the holding member thereof by use of the light-curing adhesive. Namely, as a matter of course, the fixation wall is sufficient if only the optical element holding portion uses a transparent material capable transmitting the light.

Third Embodiment

Next, a third embodiment of the present invention will be described. The third embodiment takes a construction that the fixation wall 35 is provided as separate fixation walls 35b, 35c, 35d corresponding to each of the optical elements (the collimator lens 31, the cylindrical lens 32 and the imaging lens 33). The following discussion will be focused on different points from the second embodiment, and the descriptions of the same components as in the second embodiment are omitted in a way that marks these components with the same reference numerals and symbols.

Figure 6:
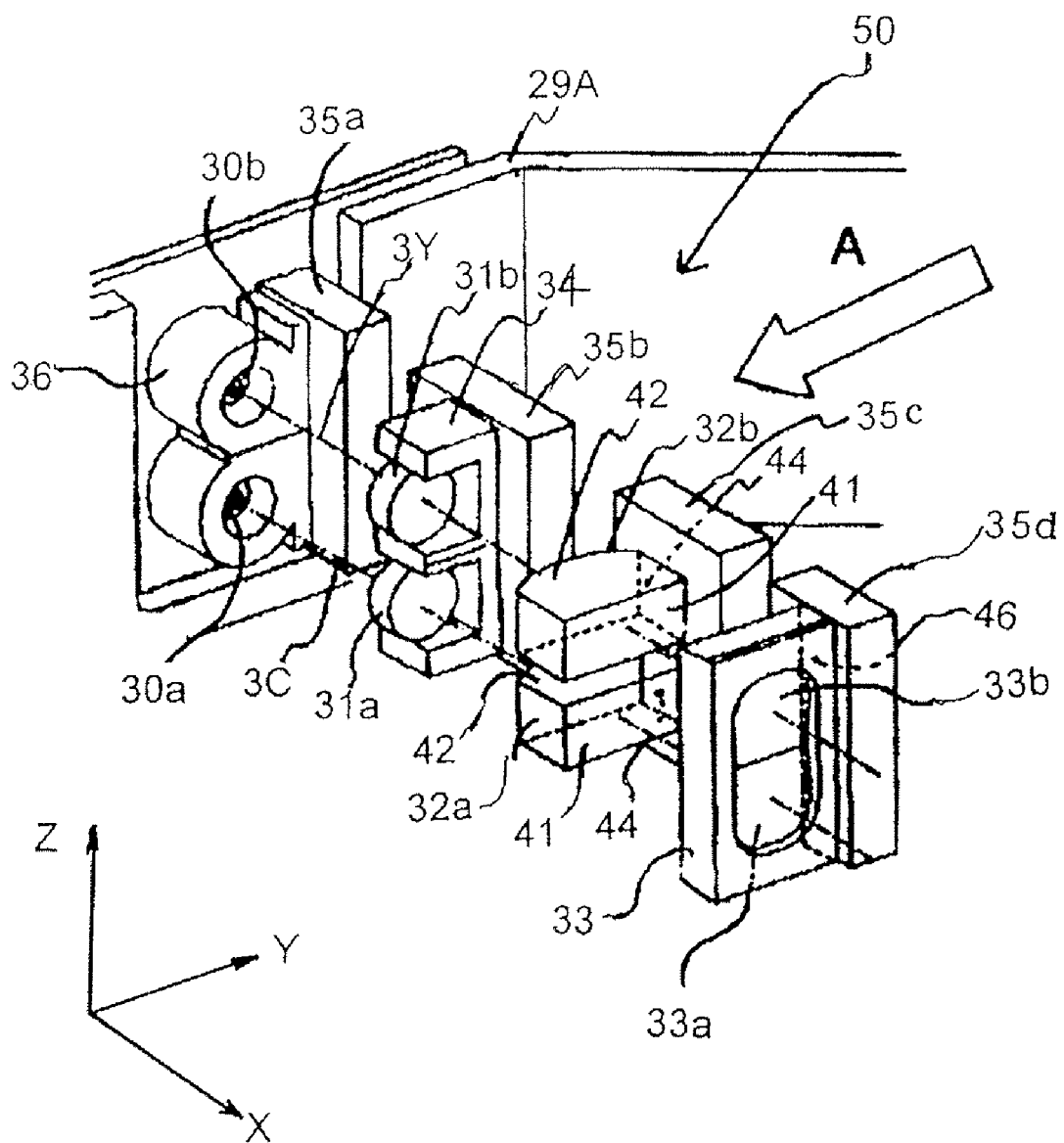
FIG. 6 is an explanatory view of the incidence optical system 50 within the optical scanning apparatus according to a third embodiment.

FIG. 6 is an explanatory view of the incidence optical system 50 within the optical scanning apparatus according to the third embodiment. As illustrated in FIG. 6, the incidence optical system 50 includes the semiconductor laser 30, the collimator lens 31, the cylindrical lens 32 and the imaging lens 33. The optical elements are constructed at two stages in the sub-scanning direction. Accordingly, the first optical path is formed between the semiconductor laser (the first light source) 30a and the rotary polygon mirror 21. The second optical path is formed between the semiconductor laser (the second light source) 30b and the rotary polygon mirror 21. The semiconductor lasers 30a, 30b are press-fixed within a laser holder 36. The collimator lenses 31a, 31b are fixedly bonded to the collimator lens holder 34. The collimator lens holder 34 is fixedly bonded to the fixation wall 35b at its edge surface (side surface) in the main-scanning direction.

The cylindrical lenses 32a, 32b are lenses each having refracting power in only the main-scanning direction. The cylindrical lenses 32a, 32b are fixedly bonded to the fixation wall 35c at their edge surfaces (side surfaces) 44 in the main-scanning direction. The resinous imaging lens 33 is constructed by integrally molding the lower imaging lens 33a and the upper imaging lens 33b together. The imaging lens 33 is the anamorphic lens having the refracting power both in the main-scanning direction and in the sub-scanning direction. The imaging lens 33 is fixedly bonded to the fixation wall 35d at the side surface thereof in the main-scanning direction. Herein, the fixation walls 35b, 35c, 35d are the transparent or semi-transparent glass plates. The glass plates are formed so that the surfaces for fixing the optical elements exhibit the high flatness.

Thus, the optical elements (the collimator lens 31, the cylindrical lens 32 and the imaging lens 33) provided on the optical path between the light source 30 and the deflector 21 are abutted on and fixed directly to the fixation walls 35b, 35c, 35d corresponding thereto. Alternatively, these optical elements are abutted on and fixed to the fixation walls 35b, 35c, 35d in the main-scanning direction via the holding member (which is the collimator lens holder 34 and the frame body of imaging lens 33).

As described above, the first optical member provided on the first optical path between the first light source and the deflector and the second optical member provided on the second optical path between the second light source and the deflector are held by the same members (the fixation walls 35b, 35c, 35d) at their side surfaces in the main-scanning direction. Hence, the positional accuracy in the main-scanning direction between the first optical path and the second optical path is improved. This construction enables the positions depicted by the first light beam and the second light beam on the scanned surfaces in the main-scanning direction to be restrained from deviating between the two light beams. More essentially, the optical characteristics of the optical scanning apparatus can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-000423, filed Jan. 5, 2006, No. 2006-000424, filed Jan. 5, 2006 and No. 2006-351008 filed on Dec. 27, 2006 which are hereby incorporated by reference herein in their entireties.

What is claimed is:

1. An optical scanning apparatus comprising:
   a first light source;
   a second light source disposed with deviation in a sub-scanning direction from the first light source;
   a deflector that deflects a first light beam emitted from the first light source and a second light beam emitted from the second light source, and that scans different scanned surfaces with the first and second light beams in a main-scanning direction;
   a first cylindrical lens having refracting power only in the main-scanning direction, the first cylindrical lens being provided on a first optical path between the first light source and the deflector, and the first light beam emitted from the first light source passing through the first cylindrical lens;
   a second cylindrical lens having refracting power only in the main-scanning direction, the second cylindrical lens being provided on a second optical path between the second light source and the deflector, the first and second cylindrical lenses being aligned in the sub-scanning direction, and the second light beam emitted from the second light source passing through the second cylindrical lens; and
   a wall including a plane that positions both of a side plane surface of the first cylindrical lens and a side plane surface of the second cylindrical lens in the main-scanning direction.

2. An optical scanning apparatus according to claim 1, wherein an optical axis of the first light beam is inclined at a predetermined angle relative to an optical axis of the second light beam.

3. An optical scanning apparatus according to claim 1, wherein the side plane surface of the first cylindrical lens and the side plane surface of the second cylindrical lens are positioned on the plane of the wall via a light-curing adhesive in the main-scanning direction.

4. An optical scanning apparatus according to claim 3, wherein the wall includes portions bonding to the first cylindrical lens and the second cylindrical lens, and the portions are formed of a transparent material.

5. An optical scanning apparatus comprising:
a first light source;
a second light source disposed with deviation in a sub-scanning direction from the first light source;
a deflector that deflects a first light beam emitted from the first light source and a second light beam emitted from the second light source, and that scans different scanned surfaces with the first and second light beams in a main-scanning direction;
a first anamorphic lens having refracting power both in the main-scanning direction and in the sub-scanning direction, the first anamorphic lens being provided on a first optical path between the first light source and the deflector, and the first light beam emitted from the first light source passing through the first anamorphic lens;
a second anamorphic lens having refracting power both in the main-scanning direction and in the sub-scanning direction, the second anamorphic lens being provided on a second optical path between the second light source and the deflector, the first and the second anamorphic lenses being aligned in the sub-scanning direction, and the second light beam emitted from the second light source passing through the second anamorphic lens; and
a wall including a plane that positions both of a side plane surface of the first anamorphic lens and a side plane surface of the second anamorphic lens in the main-scanning direction.

6. An optical scanning apparatus according to claim 5, wherein an optical axis of the first light beam is inclined at a predetermined angle relative to an optical axis of the second light beam.

7. An optical scanning apparatus according to claim 5, wherein the side plane surface of the first anamorphic lens and the side plane surface of the second anamorphic lens are positioned on the plane of the wall via a light-curing adhesive in the main-scanning direction.

8. An optical scanning apparatus according to claim 5, wherein the wall includes portions bonding to the first anamorphic lens and the second anamorphic lens, and the portions are formed of a transparent material.

* * * * *